United States Patent

[11] 3,602,745

| [72] | Inventor | Murray W. Davis |
| | | 20501 Woodmont, Harper Woods, Mich. 48225 |
| [21] | Appl. No. | 23,317 |
| [22] | Filed | Mar. 27, 1970 |
| [45] | Patented | Aug. 31, 1971 |

[54] CONCENTRIC LINEAR INDUCTION MOTOR
2 Claims, 4 Drawing Figs.

[52] U.S. Cl. .................................................... 310/13
[51] Int. Cl. ............................................... H02k 41/02
[50] Field of Search .......................................... 310/12–14, 208

[56] References Cited
UNITED STATES PATENTS

| 3,543,060 | 11/1970 | Holmes et al. .................. | 310/13 |
| 2,731,212 | 1/1956 | Baker ............................ | 310/12 X |
| 3,018,396 | 1/1962 | Colgate ......................... | 310/208 X |
| 3,148,292 | 9/1964 | Bergslien et al. ............. | 310/13 |

FOREIGN PATENTS

| 1,142,108 | 2/1969 | Great Britain ................ | 310/12 |

Primary Examiner—D. F. Duggan
Attorney—Cullen, Settle, Sloman & Cantor

ABSTRACT: A linear induction motor formed of an elongated, stationary rotor core surrounded by stationary, concentric stator coils, with an elongated tubular rotor arranged between the coils and rotor core and surrounding the rotor core, for endwise axial movement upon energization of the coils. The coils may be formed of spaced-apart rolls of conductive tape arranged end to end in axial alignment and secured to a stator core.

PATENTED AUG 31 1971 3,602,745

INVENTOR
MURRAY W. DAVIS
BY Cullen, Settle, Sloman & Cantor
ATTORNEYS

CONCENTRIC LINEAR INDUCTION MOTOR

BACKGROUND OF INVENTION

In the past, induction motors have been used to produce linear motion by utilizing different types of mechanical rotary to linear converters. These have been relatively complex, comprising a number of moving parts of relatively heavy and bulky construction. Thus, there has been a need for a lightweight, small or compact inexpensive motor for the purpose of providing a linear movement output without the requirement of using transmissions, couplings and drive mechanisms.

Thus, the invention herein relates to an induction motor having only one moving part, namely, a lightweight elongated conductive tube, which produces linear thrust output by electromagnetic induction.

SUMMARY OF INVENTION

The invention herein contemplates an induction motor made essentially of three parts, namely, a stationary stator formed of iron laminations or blocks and stator coils which surround and are concentric with a stationary rotor core which functions to concentrate the flux, and with an elongated, tubular conductive rotor surrounding the rotor core and arranged between the stator and rotor core for endwise, axial movement upon energization of the stator.

Since the tubular rotor may be of any length and its direction of travel may be reversed by reversing the direction of the travelling magnetic wave or field, it may be used as a machine element or link for moving parts to which it is connected. For example, it may be connected to a door, such as a garage door, for moving the door first in one direction and then reversing to move the door in the opposite direction. Other uses will become readily apparent to those skilled in the art.

While the form of the stator may be varied, the construction herein lends itself to a novel type of stator made of a number of coils or rolls of conductive tape, coaxially arranged end to end, but spaced apart from each other and held together rigidly within slots provided in stator bars or blocks which may be arranged in any number of symmetrical patterns about the periphery of the rolls and aligned longitudinally along the same axis as the rolls. This provides an inexpensive, yet flexible construction.

Thus, summarizing, the invention herein incorporates a long tube, forming a rotor, within which is a short, stationary rotor core, in turn surrounded by an equally short stator so that, in effect, the tube may be fed through the stator endlessly or, as a practical matter, for as long as the tube may be made within practical limits and machine requirements.

Further objects and advantages of this invention will become apparent upon reading the following description, of which the attached drawings form a part.

DETAILED DESCRIPTION

Figure 4:
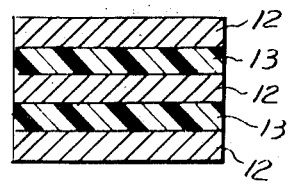
FIG. 4 is an enlarged cross-sectional view of a portion of one of the stator rolls or coils.

With reference to the drawings, the linear induction motor 10 includes a stator which is formed of coils or rolls 11 of a conductive tape, such as thin, flat, aluminum ribbon coiled into a roll form. As shown in FIG. 4, each convolution 12 of each roll is separated from the next convolution by an insulating layer 13 which may be in the form of a strip of insulating material rolled simultaneously with the conductive material or alternatively may be an insulating coating or insulating anodization applied to one or both faces of the tape before rolling. Preferably, the edges of the conductive material tape are exposed for heat dissipation by radiation and convection.

The rolls 11 are all substantially identical and are axially aligned, end to end, but spaced apart a short distance from one another and are interconnected and supported by stator core members 14 which preferably are in the form of thin iron plates laminated together to provide a thin, elongated bar extending a distance slightly greater than the overall distance of the aligned coils. Slots 15 are formed in one narrow edge of each of the stator core members 14 so that each slot receives a portion of a coil or roll 11. The slots are of sufficient depth so that each roll is received for its full radially measured distance from its inner peripheral surface to its outer peripheral surface.

The rolls 11 and the stator core members 14 together make up a rigid stator which is fixed against movement by securing same within a suitable housing or upon a suitable base support, not shown.

Arranged within the stator coaxially therewith, there is a stationary rotor core 16 which may be formed of an elongated cylindrically or tubular shaped iron material. The rotor core is approximately of the same length as the stator and is held stationary relative to the stator by any suitable means, such as by means of an elongated support rod 17 having one end fastened to a fixed support 18 (schematically shown) and its opposite end 19 fastened to an end of the rotor core. The rotor core functions to concentrate flux and there is essentially no moving force upon it so that it tends to remain stationary particularly with the help of the rod.

The only moving part of the motor is a rotor 20 in the form of a tube made of copper or aluminum material or the like, and which is considerably longer than either the rotor core or stator. The tube or rotor 20 is inserted within the stator, around the rotor core and spaced a short distance from both of these for free endwise axially directed movement in either direction.

Theoretically, the rotor 20 may be endless, although as a practical matter, it would be made in a specific length for the specific purpose for which the machine is to be used. However, being made of thin wall tubing, preferably of aluminum, it is extremely lightweight and relatively strong, thereby being adapted to many uses.

In order to guide the rotor 20 in its movement through the stator, collars 21 are fastened on the opposite ends of the stator, each containing a suitable bearing 22, with corresponding bearings 23 mounted upon the opposite ends of the rotor core, thereby supporting and guiding the rotor 20 which, theoretically, is free floating but which for practical purposes requires suitable guiding and support.

Figure 1:
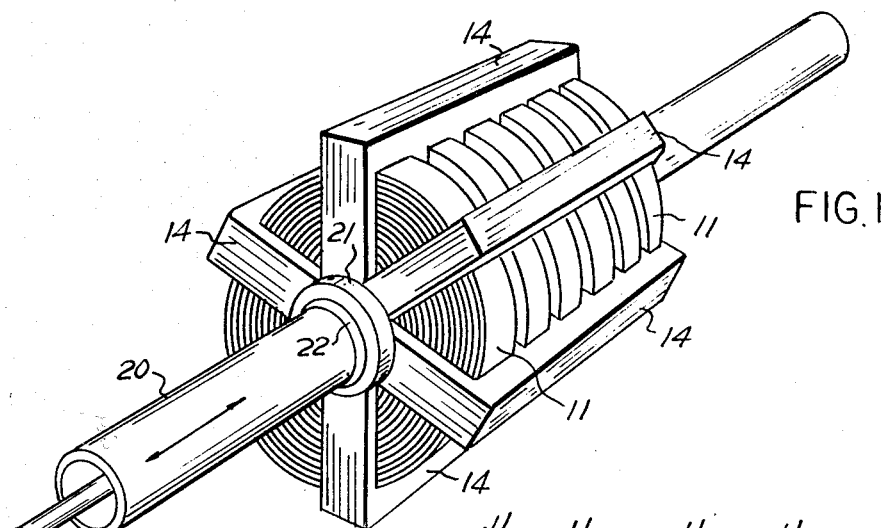
FIG. 1 illustrates a perspective view of the linear induction motor herein.
Figure 2:
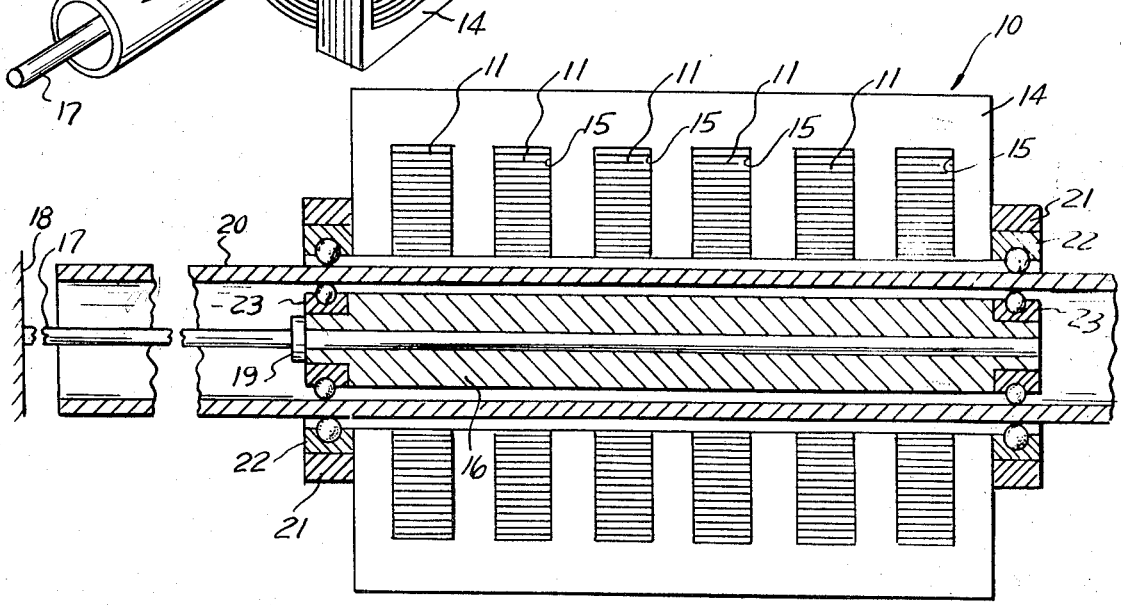
FIG. 2 is an elevational cross-sectional view of the induction motor.
Figure 3:
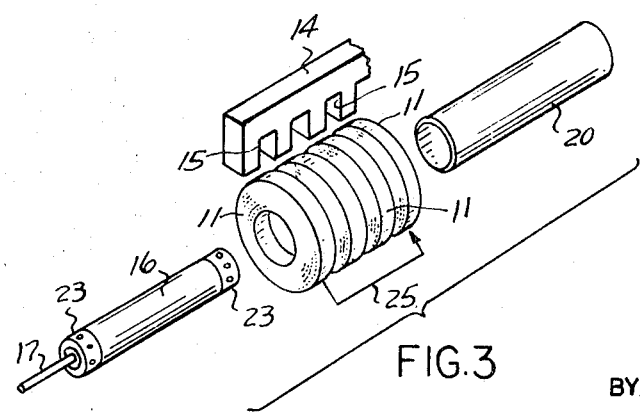
FIG. 3 is a perspective, exploded view of certain parts of the motor.

The stator coils or rolls 11 may be interconnected for suitable desired phase operation. For example, as shown in FIG. 3, connection 25 schematically illustrates connecting the first and fourth coil together for three-phase connection. In addition, either an odd or even number of coils may be used in this construction, thus adding design flexibility.

Since the rotor core, which is made of heavy iron, is only as long as the stator, that is, it is confined to the stator activated region, and since the length of output stroke is determined only by the length of the lightweight tubular rotor, increasing the stroke length does not materially increase the overall weight of the motor. Restated, the weight of the rotor core and stator are constant for any given construction, and therefor merely by using a longer tube, which is lightweight per unit length, a longer stroke is achieved with only a slight weight increase due only to the increased tube length.

This device may also function as a switching mechanism by attaching small switches upon the support rod 19 with switch activating means (such as interior extending depressions) on the wall of the tube so that as the rotor tube moves along the length of the support rod it causes the actuation of switches, which may be used to deactivate the motor or for other control purposes.

Having fully described an operative embodiment of this invention, I now claim:

1. A linear induction motor especially adapted for long stroke applications, comprising:

a stationary elongated rotor core made of a material of high magnetic permeability;

rotor core positioning means for maintaining said rotor core in a fixed axial position relative to the motor;

a stationary hollow cylindrical stator member made of a material of high magnetic permeability and positioned to concentrically surround and axially overlap said rotor core and radially spaced therefrom;

a plurality of energizable coils concentrically surrounding said rotor core and mounted on said stator member;

and an axially movable relatively light weight rotor tube made of an electrically conductive material and concentrically mounted in the radial space between said rotor core and said stator member, said rotor tube being supported and guided for axial movement relative to said rotor core and said stator member by bearings, said rotor tube being substantially longer than said rotor core and said stator member so as to be capable of achieving a long axial stroke upon energization of said coils while maintaining a full axial overlap with said rotor core and said stator member.

2. A linear induction motor especially adapted for long stroke applications, comprising:

a stationary elongated rotor core made of a material of high magnetic permeability;

rotor core positioning means for maintaining said rotor core in a fixed axial position relative to the motor;

a stationary hollow cylindrical stator positioned to concentrically surround and axially overlap said rotor core and radially spaced therefrom;

and an axially movable relatively lightweight rotor tube made of an electrically conductive material and concentrically mounted in the radial space between said rotor core and said stator member, said rotor tube being supported and guided for axial movement relative to said rotor core and said stator member, said rotor tube being substantially longer than said rotor core and said stator so as to be capable of achieving a long axial stroke upon energization of said stator while maintaining a full axial overlap with said rotor core and said stator member.